(12) United States Patent
Kim et al.

(10) Patent No.: US 10,749,709 B2
(45) Date of Patent: Aug. 18, 2020

(54) DISTRIBUTED FILE SYSTEM USING TORUS NETWORK AND METHOD FOR OPERATING THE SAME

(71) Applicant: ELECTRONICS AND TELECOMMUNICATIONS RESEARCH INSTITUTE, Daejeon (KR)

(72) Inventors: Chei-Yol Kim, Daejeon (KR); Dong-Oh Kim, Daejeon (KR); Young-Kyun Kim, Daejeon (KR); Young-Chul Kim, Daejeon (KR); Hong-Yeon Kim, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 191 days.

(21) Appl. No.: 15/663,477

(22) Filed: Jul. 28, 2017

(65) Prior Publication Data

US 2018/0212795 A1    Jul. 26, 2018

(30) Foreign Application Priority Data

Jan. 26, 2017   (KR) ........................ 10-2017-0012672

(51) Int. Cl.
| | | |
|---|---|---|
| *G06F 15/16* | (2006.01) | |
| *H04L 12/403* | (2006.01) | |
| *G06F 3/06* | (2006.01) | |
| *H04L 29/08* | (2006.01) | |
| *G06F 16/182* | (2019.01) | |

(52) U.S. Cl.
CPC ............ *H04L 12/403* (2013.01); *G06F 3/061* (2013.01); *G06F 3/067* (2013.01); *G06F 3/0611* (2013.01); *G06F 3/0635* (2013.01); *G06F 3/0643* (2013.01); *G06F 3/0647* (2013.01); *G06F 16/1824* (2019.01); *H04L 67/1097* (2013.01)

(58) Field of Classification Search
CPC .................................................. H04L 67/1097
USPC ....................................................... 709/209
See application file for complete search history.

(56) References Cited

U.S. PATENT DOCUMENTS

| | | | | |
|---|---|---|---|---|
| 5,826,033 A | * | 10/1998 | Hayashi | ............ G06F 15/17337 |
| | | | | 709/238 |
| 2003/0221056 A1 | | 11/2003 | Lee et al. | |
| 2005/0053057 A1 | * | 3/2005 | Deneroff | ........... G06F 15/17343 |
| | | | | 370/360 |
| 2008/0101395 A1 | * | 5/2008 | Ballew | ................ G06F 15/8023 |
| | | | | 370/408 |

(Continued)

FOREIGN PATENT DOCUMENTS

KR    10-2016-0121380 A    10/2016

*Primary Examiner* — Hamza N Algibhah

(57) ABSTRACT

Disclosed herein is a distributed file system using a torus network. The distributed file system includes multiple servers. The location of a master server may be determined to shorten the latency of data input/output. The location of the master server may be determined such that the distance between the master server and a node farthest away from the master server, among nodes, is minimized. When the location of the master server is determined, the characteristics of the torus network and the features of a propagation transmission scheme may be taken into consideration.

20 Claims, 22 Drawing Sheets

(56) References Cited

U.S. PATENT DOCUMENTS

| | | | |
|---|---|---|---|
| 2010/0161657 A1* | 6/2010 | Cha | G06F 16/134 707/770 |
| 2011/0173413 A1* | 7/2011 | Chen | G06F 11/348 712/11 |
| 2011/0219208 A1* | 9/2011 | Asaad | G06F 15/76 712/12 |
| 2012/0151292 A1* | 6/2012 | Rowstron | G06F 9/5066 714/748 |
| 2012/0158998 A1* | 6/2012 | O'Shea | H04L 69/40 709/245 |
| 2012/0221886 A1* | 8/2012 | Barsness | G06F 9/5027 714/4.2 |
| 2013/0086356 A1* | 4/2013 | Narang | G06F 15/17318 712/30 |
| 2013/0152089 A1* | 6/2013 | Shimamura | G06F 9/50 718/100 |
| 2013/0263138 A1* | 10/2013 | Aho | G06F 9/5072 718/102 |
| 2014/0226479 A1* | 8/2014 | Fricker | G06F 15/17393 370/235 |
| 2014/0259109 A1* | 9/2014 | Houston | H04L 63/10 726/3 |
| 2014/0344331 A1* | 11/2014 | Johns | H04L 67/16 709/203 |
| 2015/0106419 A1* | 4/2015 | Davis | H04L 67/10 709/201 |
| 2015/0160966 A1* | 6/2015 | Archer | G06F 9/5066 718/102 |
| 2015/0193270 A1* | 7/2015 | Archer | G06F 9/4843 718/102 |
| 2015/0207880 A1* | 7/2015 | Jin | H04L 67/1097 714/4.11 |
| 2015/0333956 A1* | 11/2015 | James | H04L 45/48 709/220 |
| 2015/0333957 A1* | 11/2015 | James | H04L 41/0806 709/220 |
| 2016/0274980 A1 | 9/2016 | Kim et al. | |
| 2016/0301754 A1* | 10/2016 | Lee | G06F 16/10 |
| 2016/0344618 A1* | 11/2016 | Oprea | H04L 45/12 |

\* cited by examiner

DISTRIBUTED FILE SYSTEM USING TORUS NETWORK AND METHOD FOR OPERATING THE SAME

CROSS REFERENCE TO RELATED APPLICATION

This application claims the benefit of Korean Patent Application No. 10-2017-0012672, filed Jan. 26, 2017, which is hereby incorporated by reference in its entirety into this application.

BACKGROUND OF THE INVENTION

1. Technical Field

The following embodiments relate generally to a distributed file system using a torus network and a method for operating the distributed file system using the torus network and, more particularly, to an apparatus and method that are associated with an input/output structure when the torus network is used as an interconnection network for a distributed file system.

2. Description of the Related Art

In the configuration of a server cluster, requirements are given as follows.
1) Minimization of a communication bottleneck between servers
2) Guarantee of availability of communication channels
In order to satisfy these requirements, a scheme for configuring a traditional network, such as a fat-tree network composed of multistage switches, may be used. However, when such a traditional network configuration scheme is used, the network cost increases exponentially.

In order to solve this problem, a communication scheme of a server node itself, that is, a scheme for configuring a torus network using the Network Interface Card (MC) of the server, has been proposed.

This scheme is advantageous in that, even if the scale of servers is increased, additional network construction costs are not incurred, with the exception of the expense of adding an NIC to the server, and the above-described requirements may also be satisfied.

A distributed file system is a software-based storage system that connects multiple nodes over a network to be used as single large-capacity storage.

Similar to a server cluster, a distributed file system is composed of multiple data servers. Each data server functions as a node of the distributed file system. Further, the distributed file system processes a data service request from a user via organic cooperation between the data servers. The data service request includes requests for file generation, file searching, data reading, data writing, etc.

The distributed file system may use a replication technique and/or an erasure coding technique to prevent the loss of data. The replication technique is a technique for storing a plurality of duplicates of the same data in a plurality of nodes or disks. The erasure coding technique may be a technique for generating parity via the encoding of data and for storing the data and the parity in a plurality of nodes or disks.

Both the data storage scheme based on the replication technique and the data storage scheme based on the erasure coding technique store a single piece of data in plurality of nodes rather than in a single node. Therefore, data movement frequently occurs between the nodes constituting the distributed file system.

Due thereto, network performance between nodes that constitute the distributed file system and the performance of the distributed file system are closely related to each other. Principal characteristics of a network that connects distributed file systems to each other include latency between nodes and bandwidth.

When a petabyte-level distributed file system is constructed, a switch-based fat-tree network is generally used. In a distributed file system that is not very large, a fat-tree network provides uniform and short latency between nodes.

Unlike the fat-tree network, a torus network directly connects nodes without using a switch. In the past, a torus network has chiefly been used as the network of a super computing node.

Depending on the characteristics of the connection scheme of the torus network, communication between nodes in the torus network is realized via intermediate devices, such as additional nodes between nodes, unless the nodes are directly connected. By way of such intermediate devices, the torus network has the characteristics of increasing latency for the transmission of data between nodes, as the number of intermediate nodes through which data passes when being transmitted increases.

In existing distributed file systems, network characteristics do not change depending on the location of nodes. Therefore, there is no need to consider the locations of nodes on the network. Therefore, upon determining which node or which disk of the distributed file system is to be used so as to store the data of a file, only the status of disks in nodes is used as a criterion for determination. In other words, nodes or disks in which data is to be stored may be determined such that data is equivalently allocated to all possible nodes and disks.

However, when a torus network is applied to a distributed file system, if data is transmitted and received without detecting the locations of nodes or considering latency between nodes depending on the locations, the input/output performance of the distributed file system may be drastically decreased due to the latency between the nodes.

Various types of research and development for the management of a distributed file system have been conducted. For example, in relation to a method for operating servers in a distributed file system that uses a torus network, Korean Patent Application Publication No. 10-2016-0121380 has been disclosed.

SUMMARY OF THE INVENTION

An embodiment is intended to provide a method that configures data servers on a torus network in consideration of the characteristics of a large-scale distributed file system.

An embodiment is intended to provide an apparatus and method that store data of a client in multiple distributed file system nodes in a distributed file system based on a torus network.

An embodiment is intended to provide an apparatus and method that are associated with a structure for improving the input/output performance of a distributed file system based on a torus network for constructing Exabyte-level cloud storage.

An embodiment is intended to provide an apparatus and method that are associated with an input/output structure for minimizing the difference in latency between nodes and an increase in the latency, which are disadvantages of a torus network, when the torus network is used as an interconnection network for a distributed file system.

An embodiment is intended to provide an apparatus and method that enable a distributed file system to be effectively constructed in a torus network by minimizing the difference in latency between nodes and an increase in the latency.

An embodiment is intended to provide an apparatus and method that are associated with an input/output structure for decreasing input/output latency that occurs when data of a client is stored in multiple distributed file system nodes.

An embodiment is intended to provide an apparatus and method that determine the location of a master server for receiving data of a client and processing the distribution and collection of data.

An embodiment is intended to provide an apparatus and method that determine the location of a master server for receiving data of a client and processing the encoding and decoding of data.

An embodiment is intended to provide an apparatus and method that determine the location of a master server depending on the status and arrangement of distributed file system nodes.

In accordance with an aspect, there is provided a method for managing a distributed file system, including identifying nodes of a torus network related to data; determining a location of a master server on the torus network based on locations of the nodes on the torus network; and setting a node at the determined location on the torus network as the master server.

The master server may be a center node that takes charge of transmission of the data.

The location may be determined such that a latency of input or output of the data is minimized.

The master server may transmit the data using a propagation transmission scheme.

The master server may be one of a data server, a metadata server, and a client of the torus network.

The location of the master server may be a location that minimizes a distance between the master server and a node farthest away from the master server, among the nodes.

The distance may be determined based on a number of additional nodes present in a path between the master server and the farthest node.

The location of the master server may be a center of a distance between two nodes that are farthest away from each other, among the nodes.

The location may be represented by coordinate values on multiple coordinate axes of the torus network.

The coordinate values may be calculated independently of each other.

The location may be determined in consideration of connection characteristics of the torus network.

Setting the node may include notifying the node at the determined location that the node has been set as the master server.

Setting the node may include moving data stored in a node falling outside of a series connection of the master server, among the nodes, to a node falling within the series connection.

Determining the location may include generating a first group having multiple coordinate values of multiple nodes of the torus network, in which data is stored; generating a second group of distances between two coordinate values based on the multiple coordinate values; selecting a longest distance from among the distances; generating a third group by shifting elements of the first group rightward such that, of coordinate values of the selected distance, a larger coordinate value is a first element and a smaller coordinate value is a last element; generating a fourth group by changing coordinate values in the third group to values obtained by shifting the coordinate values in a positive direction of a coordinate axis such that the larger coordinate value is 0; and determining a coordinate value of the master server based on the fourth group.

The coordinate values may include multiple coordinate values, and

Determining the location may be performed on each of the multiple coordinate values.

In accordance with another aspect, there is provided an apparatus for managing a distributed file system, including a processor for identifying nodes of a torus network related to data, and determining a location of a master server on the torus network based on locations of the nodes on the torus network; and a communication unit for notifying a node at the determined location that the node has been set as the master server.

In accordance with a further aspect, there is provided a method for determining a location of a master server in a distributed file system, including generating a first group having multiple coordinate values of multiple nodes of a torus network, in which data is stored; generating a second group of distances between two coordinate values based on the multiple coordinate values; selecting a longest distance from among the distances; generating a third group by shifting elements of the first group rightward such that, of coordinate values of the selected distance, a larger coordinate value is a first element and a smaller coordinate value is a last element; generating a fourth group by changing coordinate values in the third group to values obtained by shifting the coordinate values in a positive direction of a coordinate axis such that the larger coordinate value is 0; and determining a coordinate value of the master server based on the fourth group.

Determining the coordinate value of the master server may include determining a relative coordinate value of the master server based on the fourth group; and determining a reference coordinate value of the master server based on the relative coordinate value.

The relative coordinate value may be an average of a smallest coordinate value of the fourth group and a largest coordinate value of the fourth group.

When the average is not an integer, the relative coordinate value may be a value obtained by rounding off the average.

The reference coordinate value may be generated by changing the relative coordinate value to a value obtained by shifting the relative coordinate value by the larger coordinate value of the coordinate values of the selected distance in the positive direction of the coordinate axis.

In addition, there are provided other methods, apparatuses, and systems for implementing the present disclosure, and a computer-readable storage medium storing a computer program for executing the method.

DESCRIPTION OF THE PREFERRED EMBODIMENTS

Figure 1A:
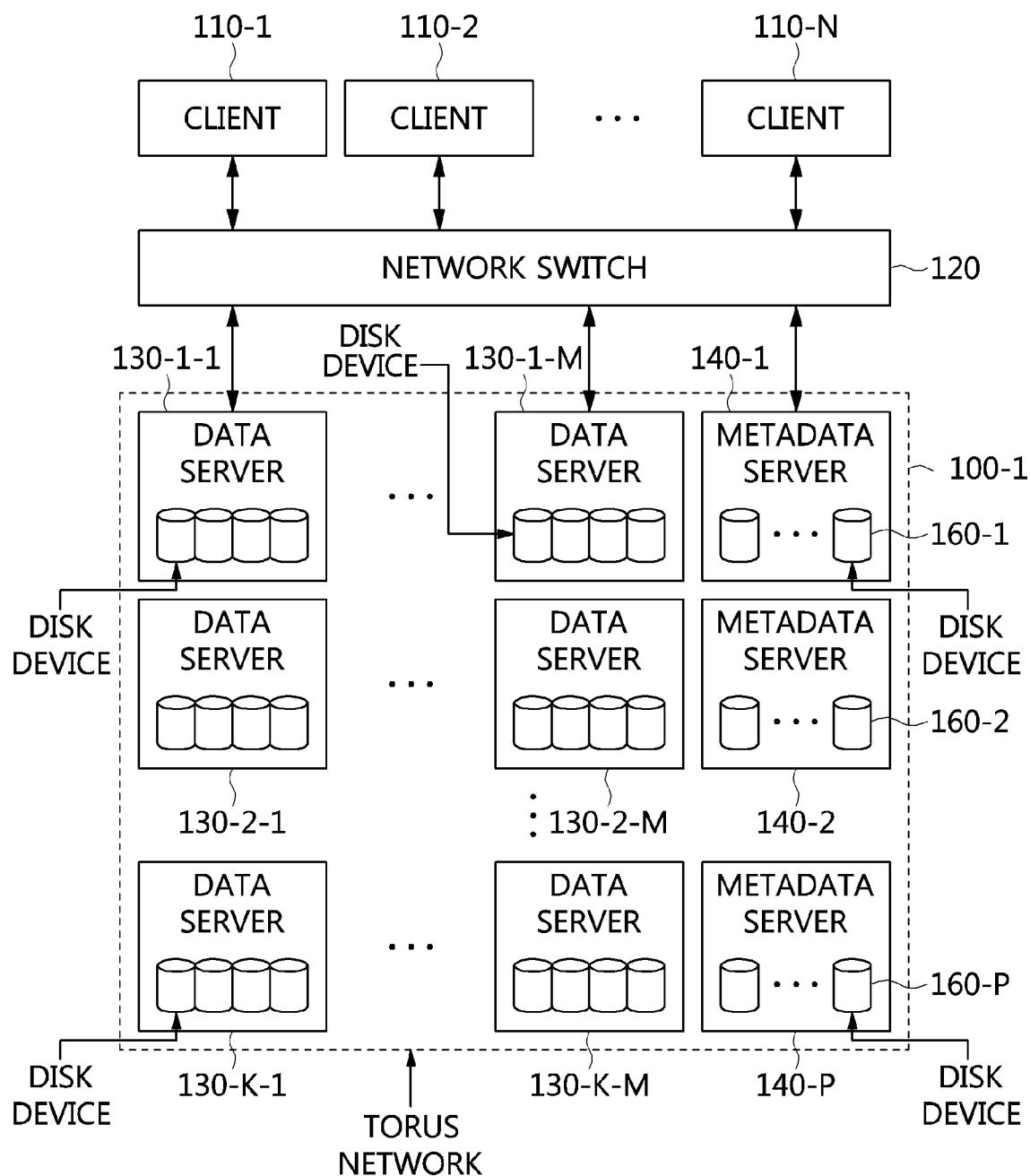
FIG. 1A illustrates a torus network-based distributed file system and a structure in which clients are connected to the distributed file system over a network using a switch according to an embodiment.

Detailed descriptions of the following exemplary embodiments will be made with reference to the attached drawings illustrating specific embodiments. These embodiments are described so that those having ordinary knowledge in the technical field to which the present disclosure pertains can easily practice the embodiments. It should be noted that various embodiments are different from each other, but do not need to be mutually exclusive to each other. For example, specific shapes, structures, and characteristics described here may be implemented as other embodiments without departing from the spirit and scope of the embodiments in relation to an embodiment. Further, it should be understood that the locations or arrangement of individual components in each disclosed embodiment can be changed without departing from the spirit and scope of the embodiments. Therefore, the accompanying detailed description is not intended to restrict the scope of the disclosure, and the scope of the exemplary embodiments is limited only by the accompanying claims, along with equivalents thereof, as long as they are appropriately described.

In the drawings, similar reference numerals are used to designate the same or similar functions in various aspects. The shapes, sizes, etc. of components in the drawings may be exaggerated to make the description clear.

The terms used in the present specification are merely used to describe specific embodiments and are not intended to limit the present disclosure. A singular expression includes a plural expression unless a description to the contrary is specifically pointed out in context. In the present specification, it should be understood that terms such as "comprises" or "comprising" are merely intended to indicate that features, numbers, steps, operations, components, parts, or combinations thereof are present, and are not intended to exclude the possibility that one or more other features, numbers, steps, operations, components, parts, or combinations thereof will be present or added, and additional components may be included in the scope of the practice of exemplary embodiments or the technical spirit of the exemplary embodiments. It will be understood that when a component is referred to as being "connected" or "coupled" to another component, it can be directly connected or coupled to the other component, or intervening components may be present. Further, it should be noted that, in exemplary embodiments, the expression describing that a component "comprises" a specific component means that additional components may be included in the scope of the practice or the technical spirit of exemplary embodiments, but do not preclude the presence of components other than the specific component.

Terms such as "first" and "second" may be used to describe various components, but the components are not restricted by the terms. The terms are used only to distinguish one component from another component. For example, a first component may be named a second component without departing from the scope of the present specification. Likewise, a second component may be named a first component.

Also, components described in the embodiments are independently shown in order to indicate different characteristic functions, but this does not mean that each of the components is formed of a separate piece of hardware or software. That is, components are arranged and included separately for convenience of description. For example, at least two of the components may be integrated into a single component. Conversely, one component may be divided into multiple components. An embodiment into which the components are integrated or an embodiment in which some components are separated is included in the scope of the present specification as long as it does not depart from the essence of the present specification.

Further, some components are not essential components for performing essential functions, but may be optional components for improving only performance. The embodiments may be implemented using only essential components for implementing the essence of the embodiments. For example, a structure including only essential components, excluding optional components used only to improve performance, is also included in the scope of the embodiments.

Embodiments will be described in detail below with reference to the accompanying drawings so that those having ordinary knowledge in the technical field to which the embodiments pertain can easily practice the embodiments. In the following description of the embodiments, detailed descriptions of known functions or configurations which are deemed to make the gist of the present specification obscure will be omitted.

In the following embodiments, proposed are a dynamic master server-based structure, which can reduce the input/output latency, and methods for determining the location of the master server when a distributed file system is constructed using a torus network.

FIG. 1A illustrates a torus network-based distributed file system and a structure in which clients are connected to the distributed file system over a network using a switch according to an embodiment.

The torus network-based distributed file system may include multiple clients. In FIG. 1A, as the multiple clients, N clients ranging from client 110-1 to client 110-N are illustrated.

The multiple clients may be connected to a network switch 120, and may access a torus network 100-1 through the network switch 120.

The torus network 100-1 may include multiple data servers and metadata servers. In FIG. 1A, as the multiple data servers, K*M data servers ranging from a data server 130-1-1 to a data server 130-K-M are illustrated. Further, in FIG. 1A, as the multiple metadata servers, P metadata servers ranging from a metadata server 140-1 to a metadata server 140-P are illustrated.

All of the data servers and metadata servers constituting the distributed file system may be implemented as parts of the torus network 100-1. For connections between the servers of the distributed file system, connected to the torus network 100-1, and clients, connected to the network switch 120, some distributed file system servers may be connected to the network switch 120. In FIG. 1A, the data server 130-1-1 to the data server 130-1-M are connected to the network switch 120, and the metadata server 140-1 may be connected to the network switch.

Each of the data servers may have a plurality of disks for storing the data of multiple file systems. Further, each of the metadata servers may have a plurality of disks for storing the metadata information of the file systems.

Figure 1B:
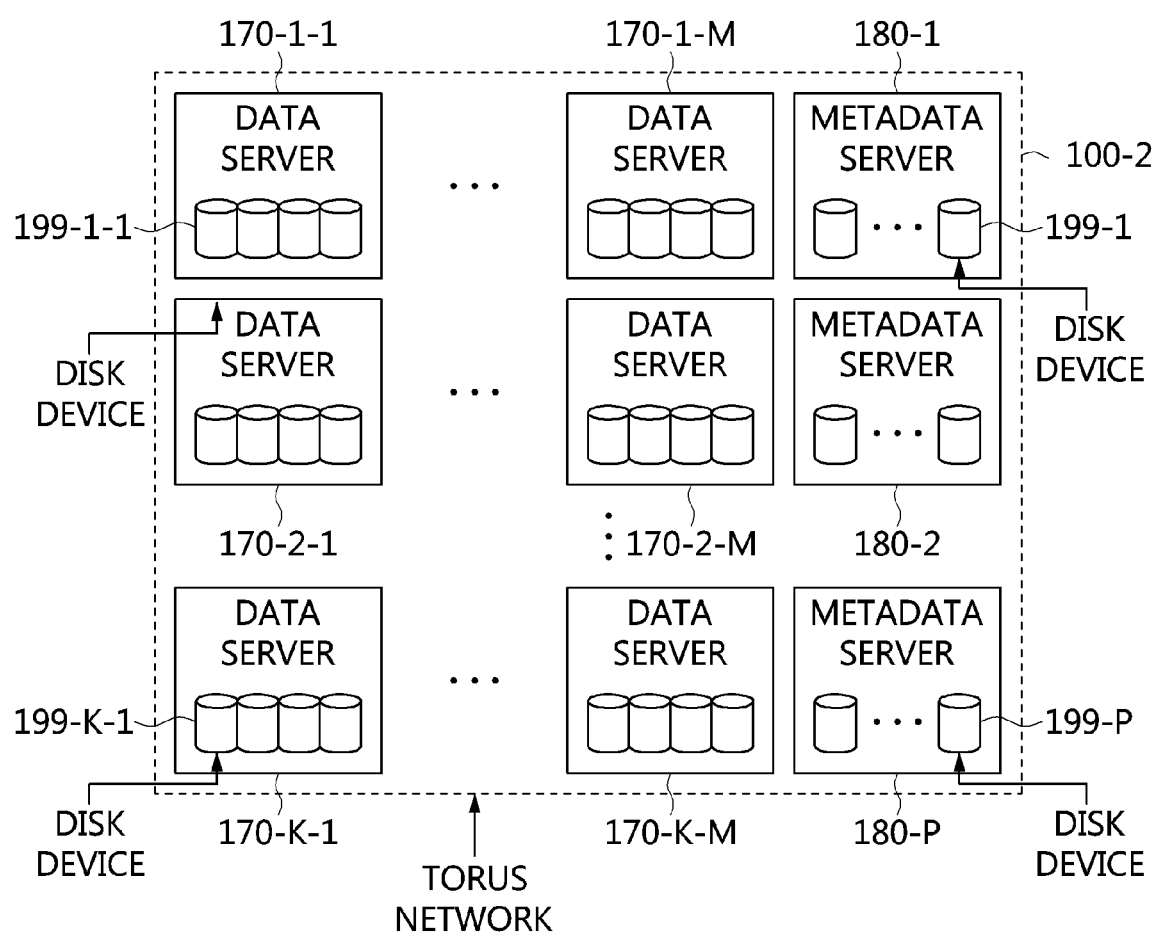
FIG. 1B illustrates a structure in which all of clients and a distributed file system are connected to each other on a torus network according to an embodiment.

FIG. 1B illustrates a structure in which all clients and a distributed file system are connected to each other on a torus network according to an embodiment.

In FIG. 1B, as multiple data servers, K*M data servers ranging from a data server 170-1-1 to a data server 170-K-M are illustrated. Further, in FIG. 1B, as multiple metadata servers, P metadata servers, ranging from a metadata server 180-1 to a metadata server 180-P, are illustrated.

Each of the data servers may have a plurality of disks for storing the data of multiple file systems. Further, each of the metadata servers may have a plurality of disks for storing the metadata information of the file systems.

In the torus network 100-2 of FIG. 1B, clients may be present in a torus network 100-2 without being separately present outside the torus network 100-2. Since the clients are not present outside the torus network 100-2, a network switch between the clients, the data servers, and the metadata servers may not be present.

Each node in the torus network 100-2 may perform the function of a client and the function of a data server together, or may perform the function of a client and the function of a metadata server together. Alternatively, each node may perform a single function rather than performing various functions together.

As shown in FIG. 1B, the clients may be located inside the torus network 100-2, together with the data servers and the metadata servers that constitute the distributed file system.

The difference between the torus network 100-1 of FIG. 1A and the torus network 100-2 of FIG. 1B is in the location where the clients are present. In other words, depending on whether the clients are located inside or outside the torus network, the torus network may be classified as one of the torus network 100-1 of FIG. 1A and the torus network 100-2 of FIG. 1B.

The network switch and the torus network may support all of various network protocols that enable the transmission/reception of messages, such as the Ethernet and InfiniBand. The torus network 100-1 and the torus network 100-2 may have various forms depending on the configuration of the network.

In the torus network 100-1 of FIG. 1A and the torus network 100-2 of FIG. 1B, a client may be provided with the file operation service of the distributed file system using a standardized file system interface or an exclusive file system interface. Here, metadata-related service may be processed by the metadata servers and input/output service for reading and/or writing a file may be processed by the data servers.

Figure 2A:
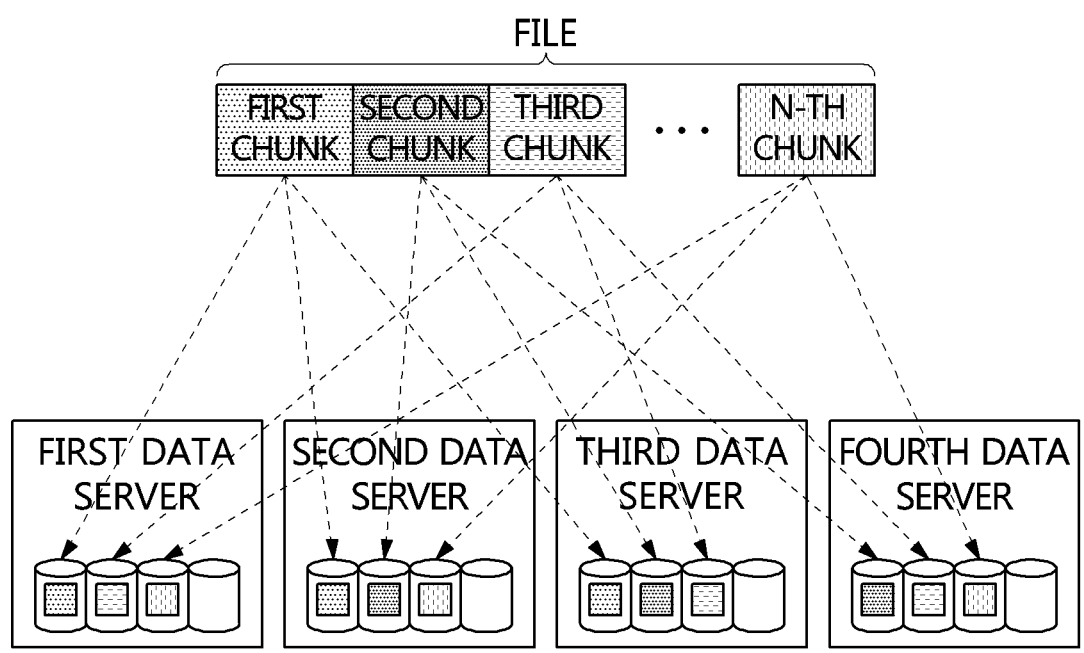
FIG. 2A illustrates the storage of data in a distributed file system using a replication scheme according to an embodiment.

FIG. 2A illustrates the storage of data in a distributed file system using a replication scheme according to an embodiment.

In FIG. 2A, the state in which a file is stored when the replication scheme is used is illustrated.

A file may be divided into multiple chunks. The sizes of the chunks may be uniform.

Each of the chunks may be duplicately stored in different data servers. By way of duplication, respective chunks may be distributed and stored.

In FIG. 2A, the file is divided into N chunks, each being duplicately stored in three of four data servers.

When each data server has a plurality of disks, the chunks may be uniformly stored in the plurality of disks in consideration of the fact that the data server has the plurality of disks. By way of uniform storage, a load is prevented from being concentrated on a single disk.

Even if a failure or the like occurs in one data server or disk, the same chunk stored in other data servers or disks may be used. As the duplication of data is increased, the risk of data being lost is decreased. In contrast, as the duplication of data is increased, data may occupy a larger portion of disks and the efficiency of storage may be decreased.

Figure 2B:
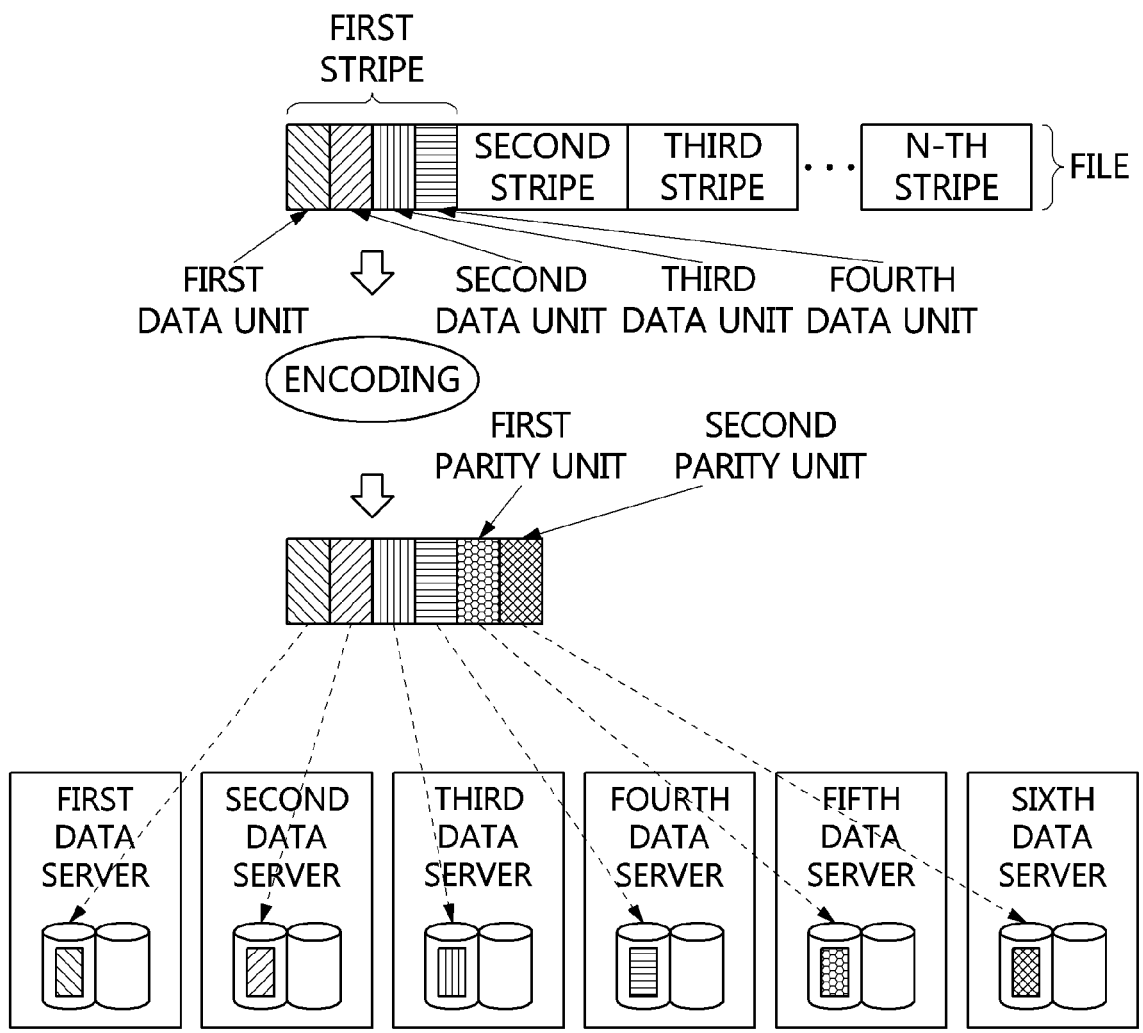
FIG. 2B illustrates the storage of data in a distributed file system using an erasure coding scheme according to an embodiment.

FIG. 2B illustrates the storage of data in a distributed file system using an erasure coding scheme according to an embodiment.

In FIG. 2B, the state in which a file is stored when the erasure coding scheme is used is illustrated.

A file may be divided into multiple stripes. Each stripe may be divided into multiple data units. The sizes of the stripes may be uniform. Furthermore, the sizes of the data units may be uniform.

In FIG. 2B, the file is divided into N stripes, each being divided into four data units.

By way of the erasure coding scheme, the stripes may be encoded, and thus parity units may be generated.

In FIG. 2B, two parity units are generated via the encoding of the stripes.

That is, m data units and one parity unit may be generated as stripe data via the encoding of a single stripe. The original stripe may be reconstructed using only the m units, regardless of whether the units are data units or parity units.

Multiple data units and multiple parity units may be distributed to and stored in multiple data servers.

Even if a failure or the like occurs in one data server or one disk, the original stripe may be reconstructed using units stored in other data servers or disks.

As described above with reference to FIGS. 2A and 2B, a replication scheme or an erasure coding scheme is supported to prevent data from being lost due to failure in a data server or a disk in the distributed file system. In order to support such fault tolerance, the data of the file must be able to be transmitted to and stored in multiple data servers without being transmitted to and stored in a single data server.

Two examples of a typical data input/output structure used to transmit data of a client to a data server will be described below.

Figure 3A:
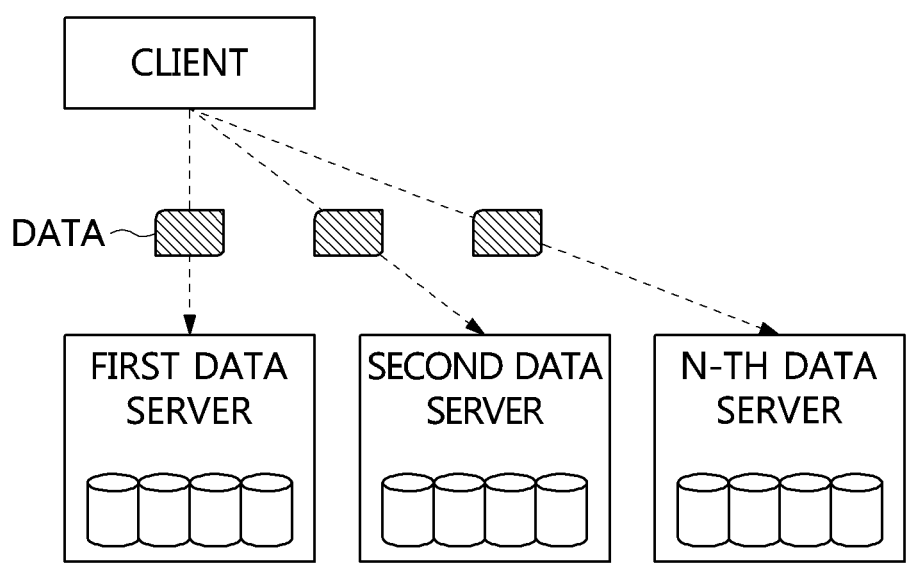
FIG. 3A illustrates data writing when a replication scheme is applied to a client-centric data input/output structure according to an embodiment.

FIG. 3A illustrates data writing when a replication scheme is applied to a client-centric data input/output structure according to an embodiment.

In the client-centric data input/output structure, a client may directly transmit data to multiple data servers in response to a write request.

Figure 3B:
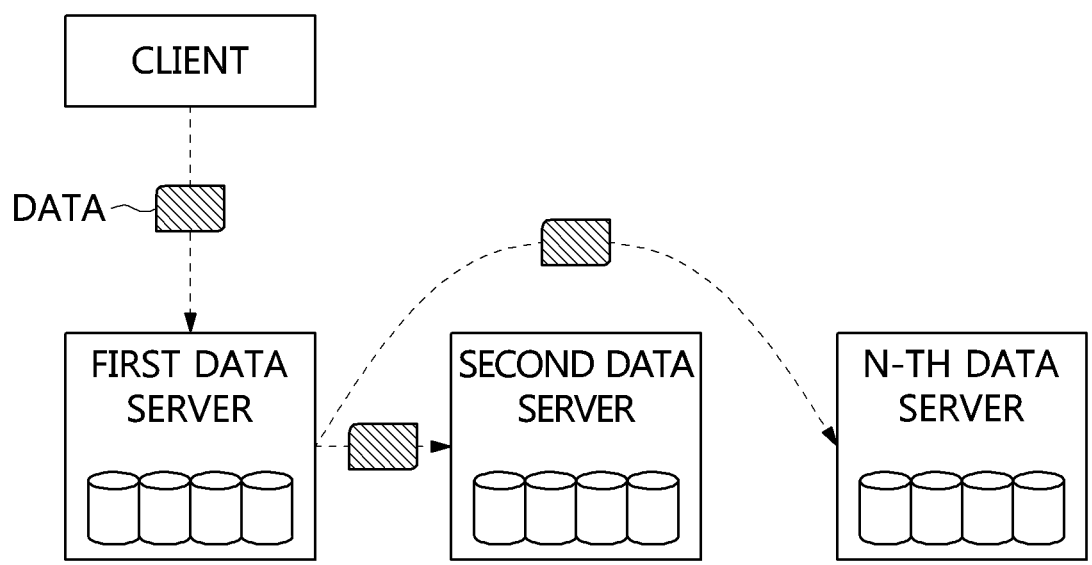
FIG. 3B illustrates data writing when a replication scheme is applied to a data server-centric data input/output structure according to an embodiment.

FIG. 3B illustrates data writing when a replication scheme is applied to a data server-centric data input/output structure according to an embodiment.

In the data server-centric data input/output structure, a client transmits data to a first data server in which data is to be stored, in response to a write request, and the first data server, having received the data, may transmit the data to the remaining data servers.

In both the client-centric data input/output structure and the data server-centric data input/output structure, the client may read data from one of the data servers in response to a read request. There is no difference in reading data between the client-centric data input/output structure and the data server-centric data input/output structure.

Figure 4A:
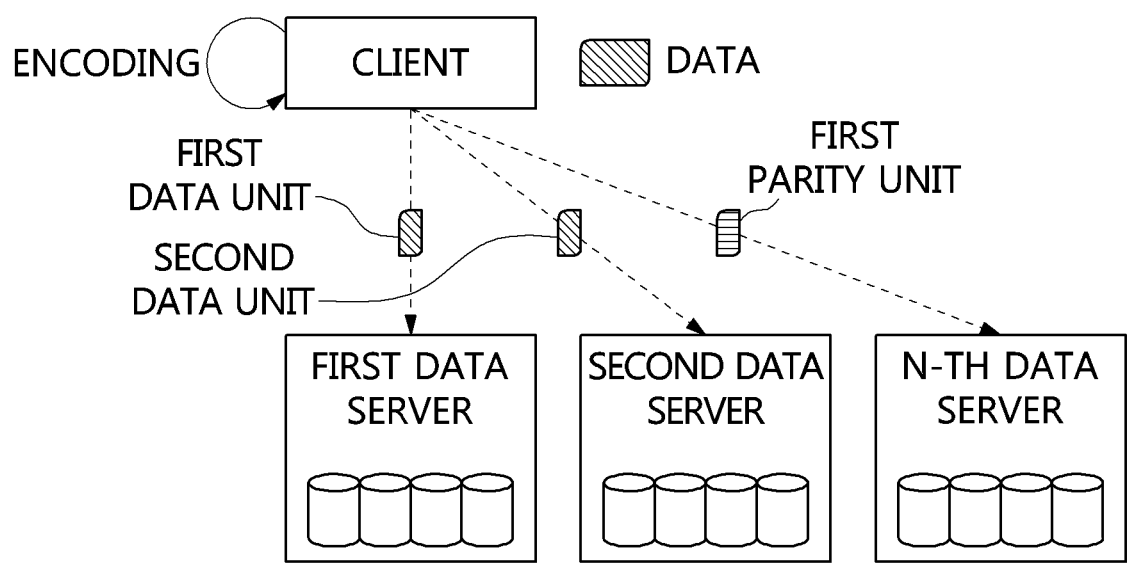
FIG. 4A illustrates data writing using erasure coding in a client-centric data input/output structure according to an embodiment.

FIG. 4A illustrates data writing using erasure coding in a client-centric data input/output structure according to an embodiment.

In the client-centric data input/output structure, a client may generate data units and a parity unit by encoding data upon processing a write request through erasure coding. Further, the client may distribute and store the generated data units and parity unit in multiple data servers.

Figure 4B:
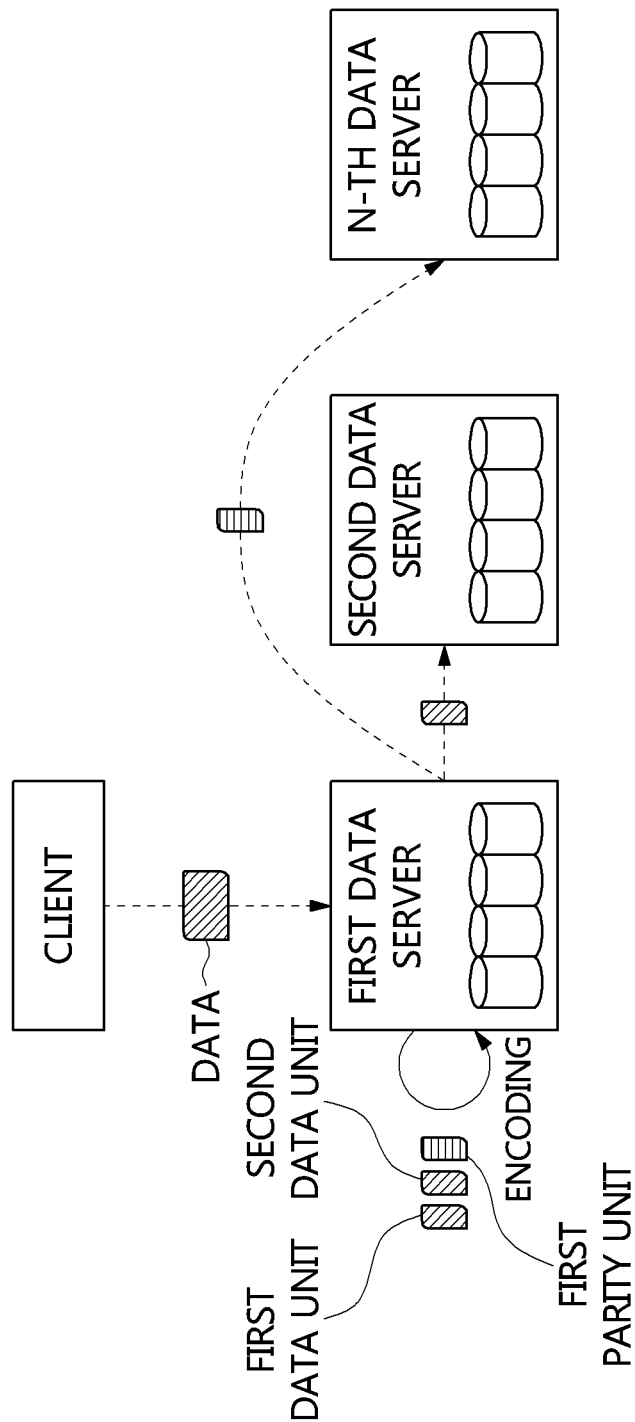
FIG. 4B illustrates data writing using erasure coding in a data server-centric data input/output structure according to an embodiment.

FIG. 4B illustrates data writing using erasure coding in a data server-centric data input/output structure according to an embodiment.

In the data server-centric data input/output structure, a client may transmit data to a first data server in which data is to be stored in response to a write request. The first data server, having received data, may generate data units and a parity unit by encoding the data. The first data server may individually transmit the generated data units and parity unit to the remaining data servers. The multiple data servers including the first data server and the remaining data servers may individually store the units.

In the client-centric data input/output structure and the data server-centric data input/output structure, a number of stripe units identical to the number of data units included in a single stripe must be able to be read from the data servers in order to generate the original data in response to a read request.

Upon processing a write request, a great difference may not be present between a replication scheme and an erasure coding scheme from the standpoint of data transmission to data servers. On the other hand, as described above, upon processing a read request, there may be a definite difference between the replication scheme and the erasure coding scheme from the standpoint of data transmission from data servers. In other words, upon processing a read request, the replication scheme may require an amount of data corresponding to a single data server, but the erasure coding scheme may basically require that data be transmitted from a number of data servers identical to the number of data units.

That is, the distributed file system that supports erasure coding inevitably requires the transmission of data for multiple data servers upon processing the reading and writing of data depending on the characteristics of erasure coding. Depending on the characteristics of erasure coding, the torus network may require the transmission of data between the multiple data servers compared to other networks. Due to this requirement, the disadvantage of latency in the torus network may emerge more strongly.

Figure 5A:
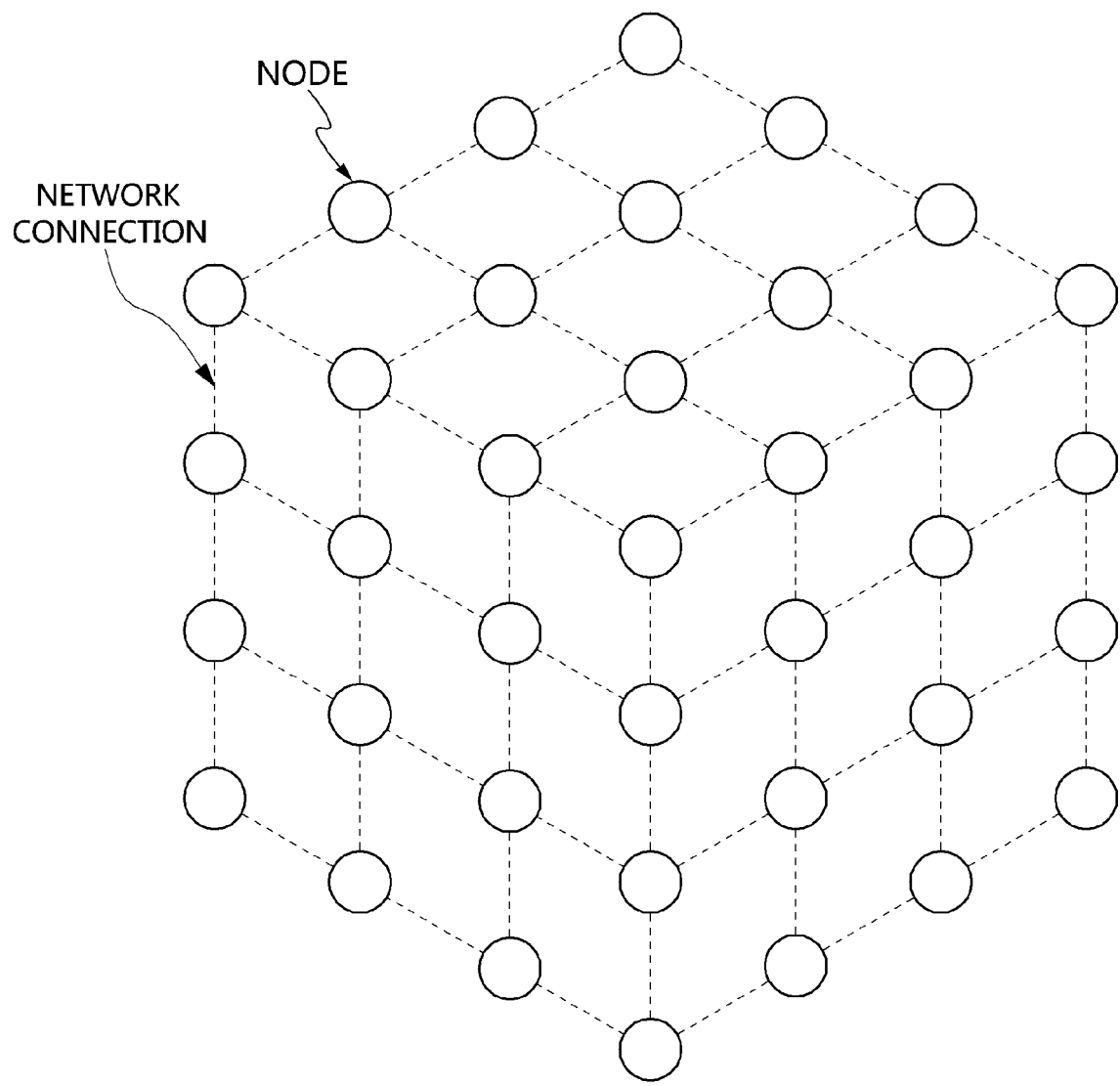
FIG. 5A illustrates the construction of a 4×4×4 three-dimensional (3D) torus network according to an embodiment.

FIG. 5A illustrates the construction of a 4×4×4 three-dimensional (3D) torus network according to an embodiment.

In FIG. 5A, circles denote the nodes of the torus network. Dotted lines may denote network connections between nodes.

In FIG. 5A, the configuration of a 4×4×4 3D torus network is illustrated. Although not shown in FIG. 5A, a torus interconnection scheme is implemented to connect nodes on a boundary to nodes on the opposite boundary. Therefore, in actuality, boundary nodes are not present, and respective nodes may have relative locations.

Figure 5B:
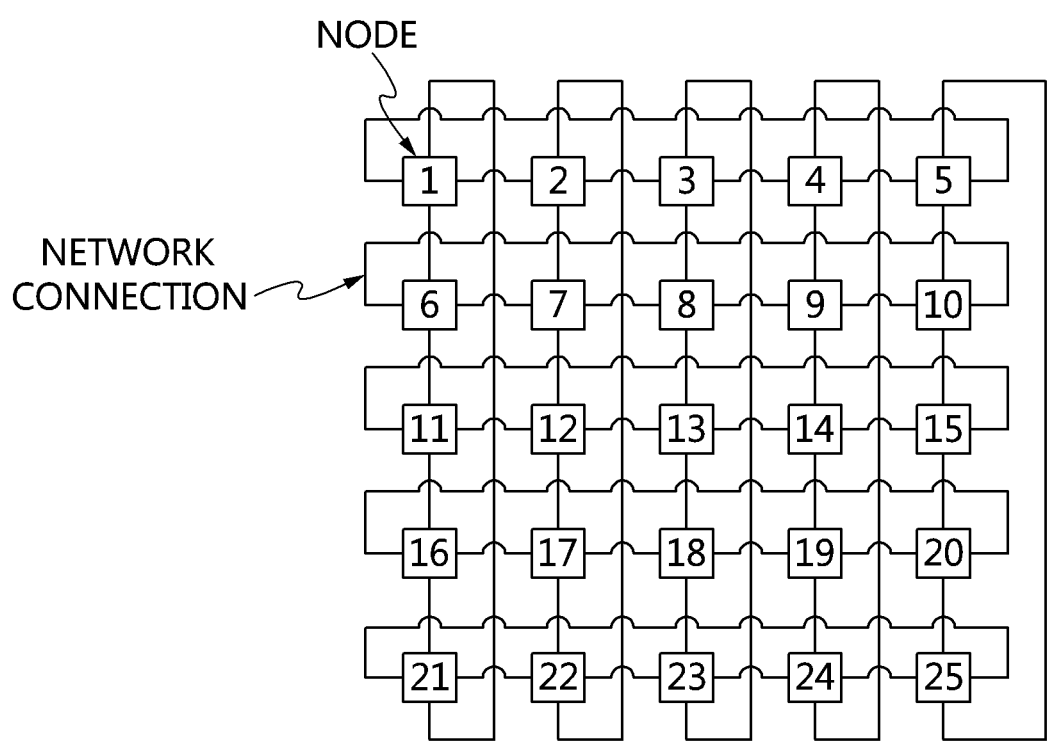
FIG. 5B illustrates the construction of a 5×5 two-dimensional (2D) torus network according to an embodiment.

FIG. 5B illustrates the construction of a 5×5 two-dimensional (2D) torus network according to an embodiment.

In FIG. 5B, the configuration of a 5×5 2D torus network is illustrated. Unlike FIG. 5A, FIG. 5B represents the interconnection of boundary nodes.

In FIG. 5B, each node is connected to nodes adjacent thereto through four network ports. Depending on the characteristics of being directly connected to the nodes of the torus network, in order to construct a 2D torus, each node must have four physical network ports. Further, in order to configure a 3D torus, each node must have six physical network ports.

Each of nodes constituting the torus has multiple physical network ports, and may simultaneously transmit data using the multiple network ports.

For example, when data is transmitted to consecutively connected data servers, a propagation transmission scheme in which data is sequentially transmitted through consecutive data servers, rather than a scheme in which data is individually transmitted to respective data servers, may be used.

Figure 6:
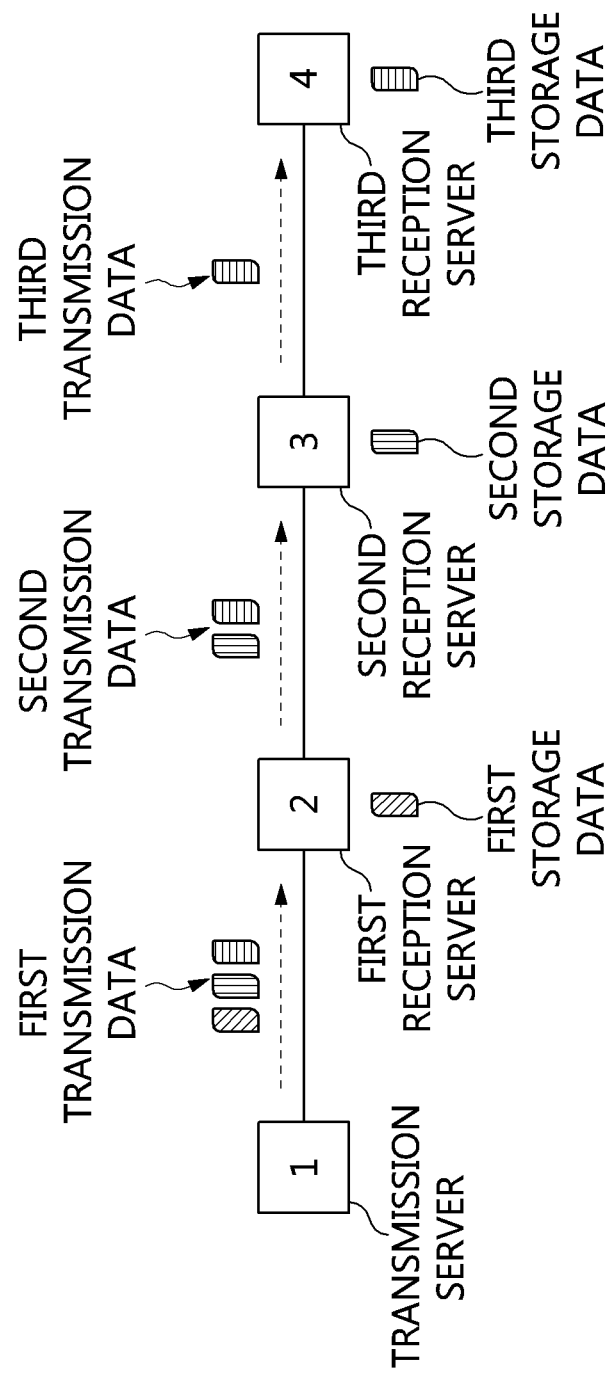
FIG. 6 illustrates a propagation transmission scheme on a torus network according to an embodiment.

FIG. 6 illustrates a propagation transmission scheme on a torus network according to an embodiment.

Three pieces of data may be respectively transmitted to three reception servers. A transmission server may transmit first transmission data, which is all data, to a first reception server that is closest to the transmission server, among the three reception servers. When receiving the first transmission data, the first reception server may store first storage data to be stored therein, among the first transmission data, and may transmit second transmission data, which is the remaining data of the first transmission data, other than the first storage data, to a second reception server. When receiving the second transmission data, the second reception server may store second storage data to be stored therein, among the second transmission data, and may transmit third transmission data, which is the remaining data of the second transmission data, other than the second storage data, to a third reception server. When receiving the third transmission data, the third reception server may store third storage data of the third transmission data.

The propagation transmission scheme may mean the above-described transmission scheme. The propagation transmission scheme may be a scheme which is also effective when additional data servers are located in the path to the final data server, even though not all data servers are directly connected to each other.

When the above-described propagation transmission scheme and the parallel transmission characteristics using the multiple network ports of the above-described torus network are utilized, the location of a center node that takes charge of input/output in the data server-centric data input/output structure may be determined, and the arrangement of data servers may be determined based on the determined location of the center node.

For reasons such as failure in the network system and the operation of the network system, the arrangement of data servers may be changed. A master server may denote a center node that takes charge of the transmission of data. The location of the master server may be dynamically changed rather than being fixed.

A dynamic master server according to an embodiment may not be necessarily located only in the node of the distributed file system. The location of the dynamic master server may be designated as a point at which input/output latency is minimized. If this location is the location of the client, the client may be the master server.

Figure 7:
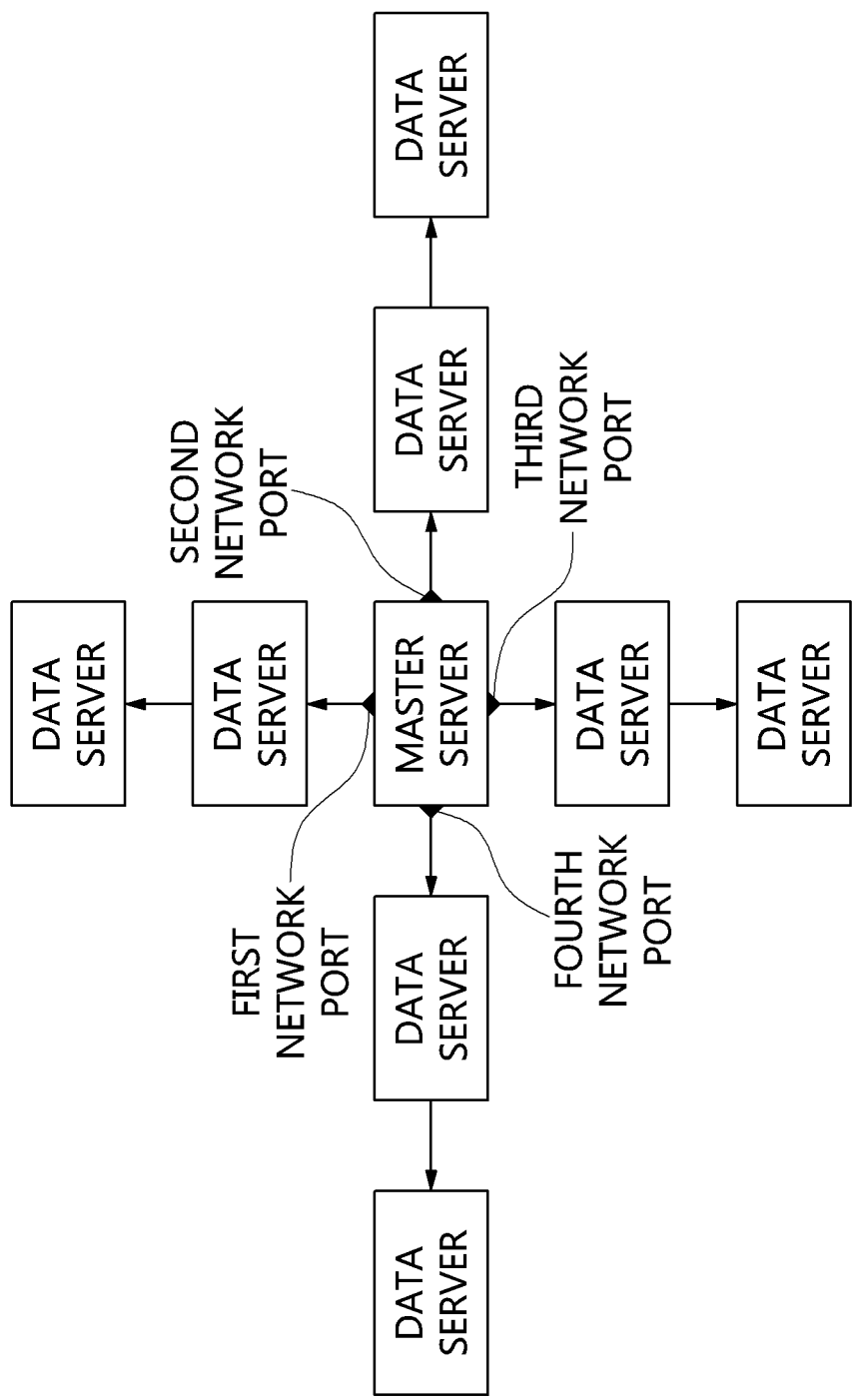
FIG. 7 illustrates the state in which a master server having four network ports transmits data to series-connected data servers using propagation transmission according to an embodiment.

FIG. 7 illustrates the state in which a master server having four network ports transmits data to series-connected data servers using propagation transmission according to an embodiment.

In a 2D torus network, the master server may have four network ports.

Two series-connected data servers may be present for each of the ports.

The master server may transmit data in parallel through the four network ports. The data servers connected in series to each of the four network ports may transmit data through propagation transmission.

In order to complete a single input/output request, all pieces of data transmitted from the master server must be able to reach respective destinations. Therefore, in the network of FIG. 7, the latency of the input/output request may be determined depending on the transmission of the data that is finally processed, among four series connections.

In consideration of the input/output characteristics of the torus network-based distributed file system, the location at which latency at individual series connections constituting a single input/output request is minimized may be determined to be the location of the master server in the present embodiment.

When all data servers are present on a number of series connections identical to the number of network ports, latency required for the input/output request may be determined by the series connection having the longest latency. Therefore, the location of the master server that can minimize the input/output latency may be the location that minimizes the network distance between the farthest data server, among the series-connected data servers, and the master server.

Therefore, in order to minimize the input/output latency, the master server may be located at the center of the distance between nodes that are farthest away from each other in various directions, among the series connections.

Figure 8:
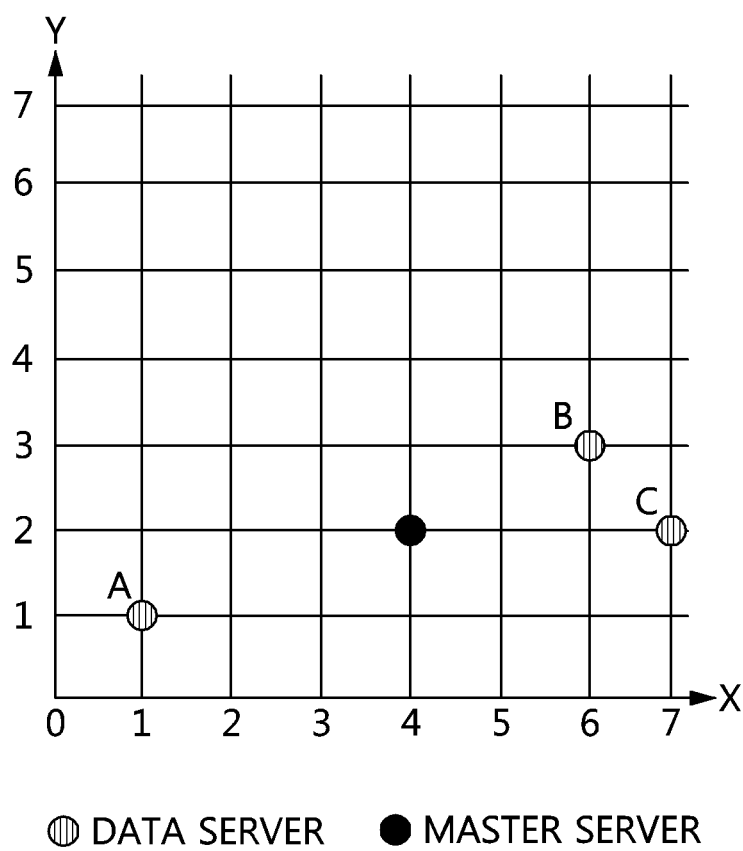
FIG. 8 illustrates three nodes and a master node on a torus network represented in an absolute coordinate system according to an embodiment.

FIG. 8 illustrates three nodes and a master node (master server) on a torus network represented in an absolute coordinate system according to an embodiment.

In FIG. 8, the connection of a 2D torus is indicated by coordinates.

When there are data servers A, B, and C, the coordinate values of the center point of the three nodes may be (4, 2). In these coordinate values, an x coordinate value and a y coordinate value may be independently calculated. In other words, the x coordinate value and the y coordinate value of the center point may be independently calculated based on the x and y coordinate values of the three nodes A, B, and C.

The x coordinate value of the center point may be the average of the maximum value and the minimum value of the x coordinate values of the three nodes. The y coordinate value of the center point may be the average of the maximum value and the minimum value of the y coordinate values of the three nodes.

The x coordinate value of the master node may be calculated using the following Equation (1).

The x coordinate value of the master node may be calculated using the following Equation (2).

$$x \text{ coordinate value of master node} = (x \text{ coordinate value of node } C + x \text{ coordinate value of node } A)/2 = (7+1)/2 = 4 \quad (1)$$

$$y \text{ coordinate value of master node} = (y \text{ coordinate value of node } B + y \text{ coordinate value of node } A)/2 = (3+1)/2 = 2 \quad (2)$$

According to the determined location of the master server, the master server is farthest away from data server A, among the three data servers, and the distance between the master server and data server A may be 4. Here, the distance between the nodes may be "the number of additional nodes present between the corresponding nodes+1".

The nodes located at both ends of the coordinate axis of the torus network may be connected to each other. For example, a node having coordinate values of (0, 0) and a node having coordinate values of (0, 7) may be connected to each other. The calculation method according to the above-described Equations (1) and (2) may be effective when the nodes at both ends of the coordinate axis are not connected to each other. Therefore, in the torus network in which the nodes at both ends of the coordinate axis are connected to each other, the absolute coordinates calculated using the above-described Equations (1) and (2) cannot be applied as the location of the master server. In order to determine the location of the master node in the torus network, a connection between the boundary nodes of the torus network must be taken into consideration.

Figure 9:
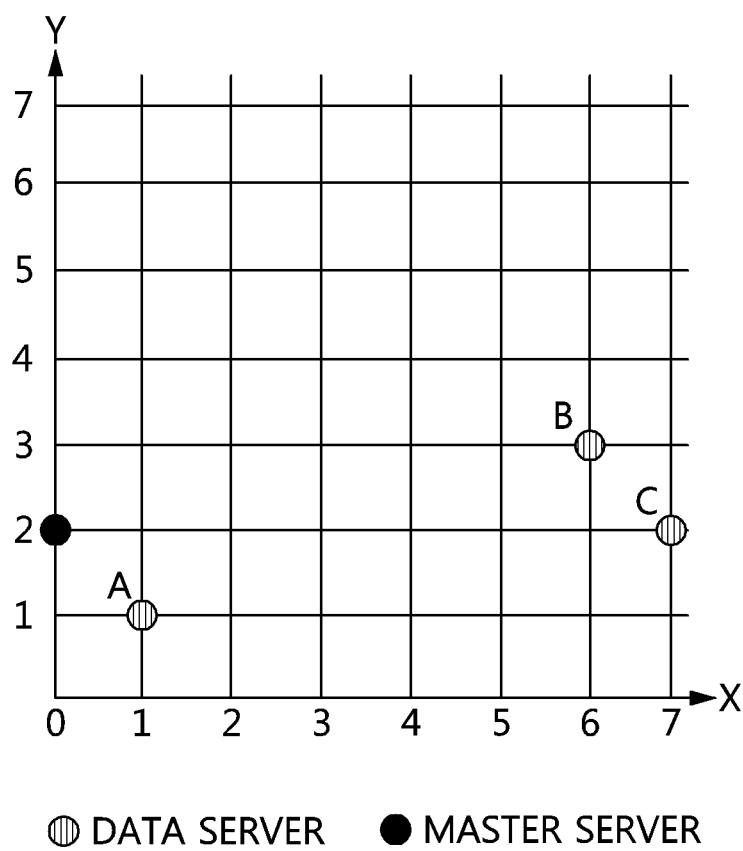
FIG. 9 illustrates the determination of a master node closest to three nodes in consideration of the connection of a torus network according to an embodiment.

FIG. 9 illustrates the determination of a master node closest to three nodes in consideration of the connection of a torus network according to an embodiment.

When the connection of the torus network is taken into consideration, the location of the master node is represented. The coordinate values at the location of a newly determined master server may be (0, 2). In this case, the distance between the master server and node A may be 2, the distance between the master server and node B may be 3, and the distance between the master server and node C may be 1.

As described above with reference to FIG. 8, when the connection of the torus network is not taken into consideration, a first location corresponding to the coordinate values (4, 2) may be determined. When the location of the master server is the first location, the distance between the master server and the farthest data server A may be 4. In contrast, when the connection of the torus network is taken into consideration, a second location corresponding to the coordinate values (0, 2) may be determined. When the location of the master server is the second location, the distance between the master server and the farthest data server may be 3. In other words, since the location of the master server is determined in consideration of the connection of the torus network, the distance between the master server and the farthest data server may be further shortened.

As shown in FIG. 8, when coordinates indicating the location of the master server are reference coordinates, the method for obtaining the x coordinate value of the master server for the reference coordinates will be described in detail with reference to FIGS. 10A to 10E. Hereinafter, a "data server" may also be referred to as a "node".

Figure 10A:
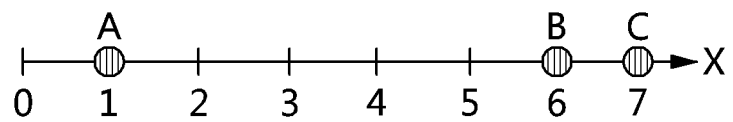
FIG. 10A illustrates the locations of three nodes on an x axis according to an example.

FIG. 10A illustrates the locations of three nodes on an x axis according to an example.

In FIG. 10A, three nodes are indicated on the x axis.

Figure 10B:
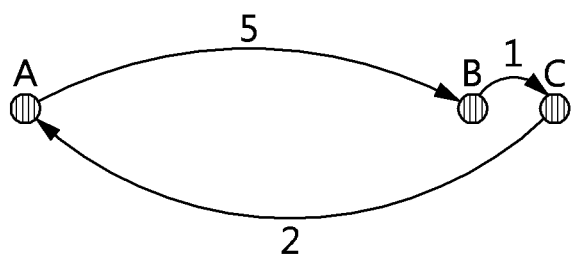
FIG. 10B illustrates distances between three nodes that are unidirectionally measured according to an example.

FIG. 10B illustrates the distances between the three nodes, unidirectionally measured, according to an example.

In FIG. 10B, the distances between two respective nodes, among the three nodes, are illustrated. The distances between the two nodes are measured in the direction in which an x coordinate value increases.

In FIG. 10B, numbers adjacent to arrows indicate distances between two nodes. Here, the distances may be determined in consideration of the connection of the torus network.

The distance between node A and node B may be 5. The distance between node B and node C may be 1. The distance between node C and node A may be 2.

Figure 10C:
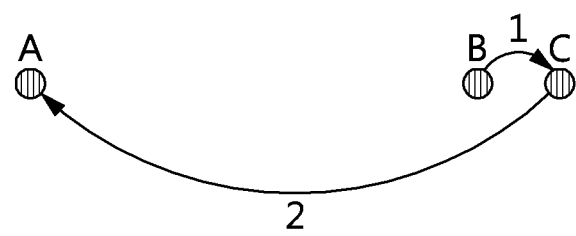
FIG. 10C illustrates the elimination of a distance having the largest value from the unidirectional distances between three nodes according to an example.

FIG. 10C illustrates the state in which the longest distance is eliminated from the unidirectional distances between three nodes according to an example.

Among the distances shown in FIG. 10B, the longest distance may be the distance between node A and node B. In FIG. 10C, the longest distance, that is, the distance between node A and node B, is eliminated.

Figure 10D:
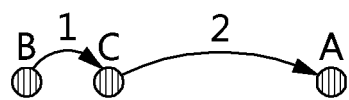
FIG. 10D illustrates nodes when node B is rearranged as a starting point according to an example.

FIG. 10D illustrates nodes when node B is rearranged as a starting point according to an example.

According to FIG. 10C, a node at which a connection between nodes begins may be node B. In FIG. 10D, the nodes are rearranged based on node B, at which the connection between nodes begins.

Figure 10E:
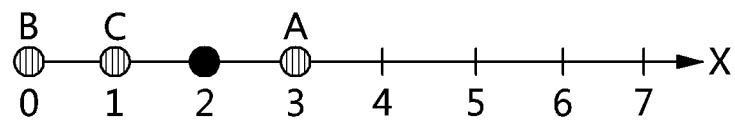
FIG. 10E illustrates three nodes and a master server in a relative coordinate system in which node B has a coordinate value of 0, according to an example.

FIG. 10E illustrates three nodes and a master server in a relative coordinate system in which node B has a coordinate value of 0 according to an example.

In FIG. 10E, the rearranged nodes are indicated on an x axis. Node B, which is an initial starting point, may be located at coordinate "0". According to the distance between the nodes, other nodes, that is, node A and node C, may be arranged on the coordinate axis.

The coordinates of nodes in FIG. 10E may be relative coordinates.

The relative coordinates may be coordinates when three nodes are closest to each other. When the location of the master server is determined using the above-described scheme based on the relative coordinates, the following Equation (3) may be used.

$$x \text{ coordinate value of master node in relative coordinate system} = (3+0)/2 = 1.5 \approx 2 \quad (3)$$

In the coordinates of the torus network, only integer coordinate values may be permitted. Therefore, the calculated x coordinate value may be rounded off.

The x coordinate value of the master server in the relative coordinate system may be converted into a reference coordinate value, as given by the following Equation (4):

$$x \text{ coordinate value of master server in reference coordinate system} = (2+(8-2)) \bmod 8 = 0 \quad (4)$$

In Equation (4), 8 may indicate the total number of coordinate values. Further, the first "2" in Equation (4) may denote the coordinate value of the master server in the relative coordinate system. The second "2" in Equation (4) may be a shift value in a positive direction for shifting the coordinate of the node B to "0" in the reference coordinate system.

Through the procedure, described above with reference to FIGS. 10A to 10E, the location of the master server may be individually determined for the x axis and the y axis.

Figure 11:
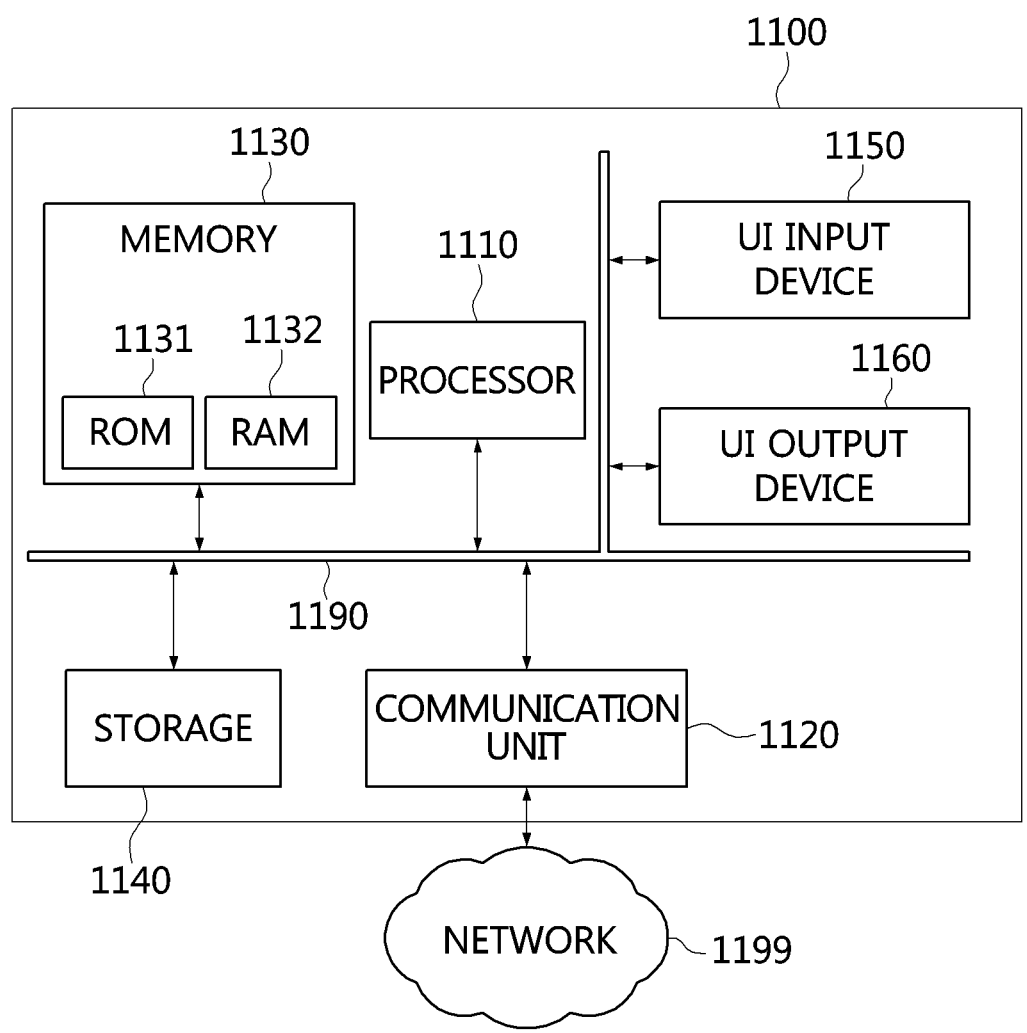
FIG. 11 is a configuration diagram of an apparatus for managing a distributed file system according to an embodiment.

FIG. 11 is a configuration diagram of an apparatus for managing a distributed file system according to an embodiment.

A distributed file system management apparatus 1100 may be a general-purpose computer system for managing a distributed file system.

The distributed file system management apparatus may correspond to the above-described node, client, data server or master server.

As shown in FIG. 11, the distributed file system management apparatus 1100 may include at least one processor 1110, memory 1130, a User Interface (UI) input device 1150, a UI output device 1160, and storage 1140, which communicate with each other through a bus 1199. The distributed file system management apparatus 1100 may further include a communication unit 1120 connected to a network 1199.

The processor 1110 may be a Central Processing Unit (CPU), or a semiconductor device for executing processing instructions stored in the memory 1130 or the storage 1140.

Each of the memory 1130 and the storage 1140 may be any of various types of volatile or nonvolatile storage media. For example, the memory may include at least one of Read-Only Memory (ROM) 1131 and Random Access Memory (RAM) 1132.

The storage media may store at least one module for the operation of the distributed file system management apparatus 1100. The memory 1130 may be configured to store at least one module and to allow the module to be executed by the at least one processor 1110.

According to an embodiment, at least some of the functions, operations or steps performed by the processor 1110 may be program modules, and may communicate with an external device or system. The program modules may be included in the distributed file system management apparatus 1100 in the form of an operating system, an application program module, and other program modules.

The program modules may be physically stored in various types of well-known storage devices. Further, at least some of the program modules may also be stored in a remote storage device that is capable of communicating with the distributed file system management apparatus 1100.

The program modules may include, but are not limited to, a routine, a subroutine, a program, an object, a component, and a data structure for performing functions or operations according to an embodiment or for implementing abstract data types according to an embodiment.

The program modules may be implemented using instructions or code executed by the processor 1110.

Functions related to the communication of data or information of the distributed file system management apparatus 1100 may be performed by the communication unit 1120.

For example, the processor 1110 may identify the nodes of a torus network related to data, and may determine the location of the master server on the torus network based on the locations of the nodes on the torus network. The communication unit 1120 may notify the node at the determined location that the node has been set as the master node.

Figure 12:
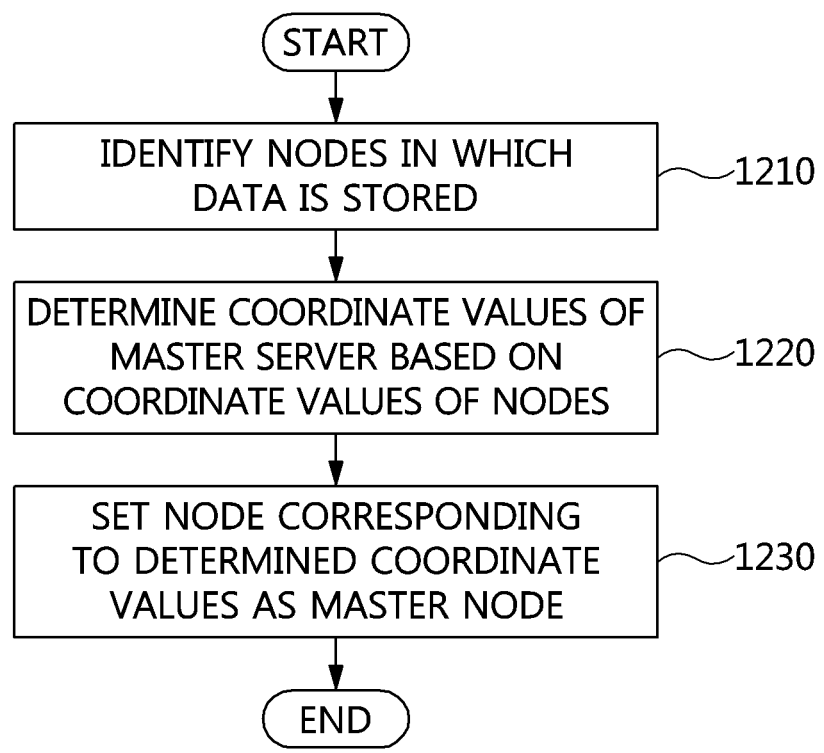
FIG. 12 is a flowchart of a method for managing a distributed file system according to an embodiment.

FIG. 12 is a flowchart of a method for managing a distributed file system according to an embodiment.

The distributed file system may include metadata servers, data servers, and clients. The distributed file system may include multiple metadata servers connected to the torus network and/or a switch, and multiple data servers connected to the torus network. Further, the distributed file system may include multiple clients connected through a network switch and/or multiple clients connected to the torus network. Furthermore, the distributed file system may include a master server for receiving data from the clients and transmitting the received data to multiple data servers in parallel. The master server may include multiple master servers.

Here, the location of each master server may be dynamically changed depending on the locations of the data servers related to data which is handled by the master server. In the following embodiments, "node" may denote a data server.

At step 1210, the processor 1110 may identify the nodes of the torus network related to data. Here, the nodes related to data may be nodes which store data, nodes to which data is to be written, and/or nodes from which data is to be read.

At step 1220, the processor 1110 may determine the location of the master server on the torus network based on the locations of the nodes on the torus network.

The master server may be a center node that takes charge of the transmission of data. For example, the master server may transmit data using a propagation transmission scheme.

The location of the master server may be determined such that the latency of the input or output of data is minimized.

The master server may be the data server, metadata server or client of the torus network. The distributed file system may include nodes connected to each other over the torus network.

The location of the master server may be the location which minimizes the distance between the master server and a node farthest away from the master server, among the nodes. Such a location determination method may be used in consideration of the above-described propagation transmission scheme.

Here, the distance between the nodes may be determined based on the number of additional nodes present between the corresponding nodes. For example, the distance between the master server and the farthest node may be determined based on the number of additional nodes present in the path between the master server and the farthest node. The distance between the master server and the farthest node may be obtained by adding 1 to the number of additional nodes present in the path.

The location of the master server may be the center of the distance between two nodes which are farthest away from each other, among the nodes.

The location of the master server may be represented by coordinate values on multiple coordinate axes of the torus network. For example, for the 3D torus network, the location of the master server may be represented by (x, y, z).

When the location of the master server is calculated, coordinate values constituting the location may be calculated independently of each other. For example, after the value of an x coordinate has been calculated, the value of a y coordinate may be calculated, and then the value of a z coordinate may be calculated. The coordinate values may also be calculated in parallel.

Further, the location of the master server may be determined in consideration of the characteristics of the connection of the torus network and the features of transmission. In other words, the nodes located at both ends of each coordinate axis of the torus network may be connected to each other, and the location of the master server may be determined in consideration of this connection. Also, as described above, data in the torus network may be transmitted using a propagation transmission scheme. The location of the master server may be determined in consideration of the features of the propagation transmission scheme.

Step 1220 will be described in greater detail later with reference to FIG. 13.

At step 1230, the processor 1110 may set a node at the determined location on the torus network as the master server.

For example, step 1230 may include the step of notifying the node at the determined location that the node has been set as the master server.

For example, steps 1210 and 1220 may be performed by each node of the distributed file system, and the node, having confirmed that it is the master server, may set itself as the master server, and may then function as the master server.

For example, step 1230 may move data in the node falling outside of the series connection of the master server, among the nodes, to another node falling within the series connection. As described above, the data managed by the master server must be stored in the data node falling within the series connection of the master server. Therefore, after the master server has been determined, if a data server that falls outside of the series connection of the master server is present among data servers that store data managed by the master server, data stored in the corresponding data server must be moved to another data server falling within the series connection.

Figure 13:
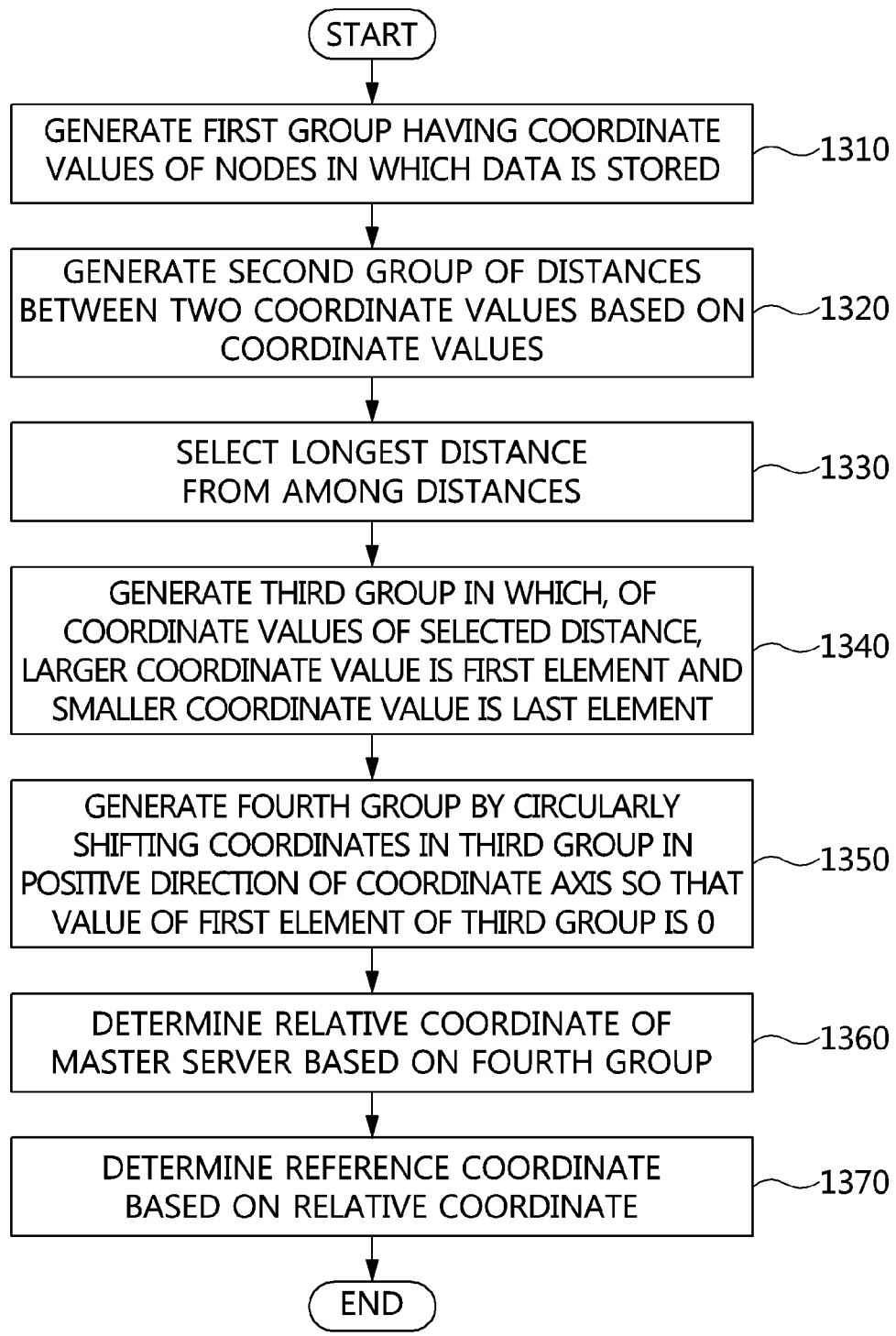
FIG. 13 is a flowchart of a method for determining the location of a master server in a distributed file system according to an embodiment.

FIG. 13 is a flowchart of a method for determining the location of a master server in a distributed file system according to an embodiment.

At step 1310, the processor 1110 may generate a first group having multiple coordinate values of multiple nodes on a torus network, in which data is stored.

Here, each group may be a set or an ordered pair.

A first group $S_0$ may be represented by the following Equation (5).

Below, values $x_1$ to $x_n$ of an x coordinate, among the coordinates of the nodes, are exemplified.

$$S_0 = \{x_1, x_2, \ldots, x_n\} \quad (5)$$

where n denotes the number of elements or coordinate values.

At step 1320, the processor 1110 may generate a second group of distances between two coordinate values based on the multiple coordinate values in the first group.

Two coordinate values may be selected from among the multiple coordinate values in the first group. The distance between the two coordinate values may be the distance from a smaller one of the two coordinate values to a larger one of the two coordinate values. In other words, the distance may be the distance in a direction in which, for the two coordinate values, a coordinate value is increased.

A second group $S_1$ may be represented by the following Equation (6):

$$S_1 = \{|\vec{x_1 x_2}|, |\vec{x_2 x_3}|, \ldots, |\vec{x_n x_1}|\} \quad (6)$$

At step 1330, the processor 1110 may select a distance having the largest value, that is, the longest distance, from among the distances in the second group. The processor 1110 may select the element having the largest value by comparing the elements in the second group with each other. Hereinafter, the selected distance or element will be represented by $|\vec{x_i x_{i+1}}|$.

At step 1340, the processor 1110 may generate a third group by shifting elements in the first group rightward so that the larger one $x_{i-1}$ of the coordinate values of the selected distance is a first element and the smaller one $x_i$ of the coordinate values of the selected distance is the last element.

A shift may indicate a circular movement.

The third group $S_2$ may be represented by the following Equation (7):

$$S_2 = \{x_{i+1}, x_{i+2}, \ldots, x_i\} \quad (7)$$

In other words, may be a first element of $S_2$, and X, may be the last element of $S_2$. The k-th element of $S_0$ may be a "(k+n−i) mod (n−1)"-th element of $S_2$.

At step 1350, the processor 1110 may generate a fourth group by changing coordinate values of the third group to values obtained by shifting the coordinate values in the positive direction of the coordinate axis so that the larger coordinate value $x_{i+1}$ becomes 0.

The fourth group $S_3$ may be represented by the following Equation (8):

$$S_3 = \{(x_{i+1} - (K - x_{i+1})) \bmod K, (x_{i+2} + (K - x_{i+1})) \bmod K, \ldots, (x_i + (K - x_{i+1})) \bmod K\} \quad (8)$$

where K denotes the total number of coordinates on the axis. The coordinate values of the third group may be circularly shifted rightward by $K - x_{i+1}$, and the coordinate values changed after the circular shifting may be the coordinate values of the fourth group.

At steps 1360 and 1370, the processor 1110 may determine the coordinate value of the master server based on the fourth group.

At step 1360, the processor 1110 may determine the relative coordinate value $C_r$ of the master server based on the fourth group.

The relative coordinate value $C_r$ may be calculated using the following Equation (9):

$$C_r = (\text{Max}(S_3) + \text{Min}(S_3))/2) \quad (9)$$

The relative coordinate value $C_r$ may be the average of the smallest coordinate value of the fourth group and the largest coordinate value of the fourth group. If the average is not an integer, the relative coordinate value may be obtained by rounding off the average.

At step 1370, the processor 1110 may determine the reference coordinate value of the master server based on the relative coordinate value.

The reference coordinate value C may be generated by changing the relative coordinate value $C_r$ to a value obtained by shifting the relative coordinate value by the largest coordinate value $x_{i+1}$ in a positive direction of the coordinate axis.

The reference coordinate value C may be calculated using the following Equation (10):

$$C = (C_r + x_{i+1}) \bmod K \quad (10)$$

When the reference coordinate value C is calculated, the reference coordinate value C may be returned to the target that requested the reference coordinate value.

The above-described coordinate value may include multiple coordinate values. Steps 1310, 1320, 1330, 1340, 1350, 1360 and 1370 may be separately performed on multiple respective coordinate values.

In other words, when the torus network is a 2D network, steps 1310, 1320, 1330, 1340, 1350, 1360 and 1370 may be performed for an x coordinate axis and a y coordinate axis. In this case, the x coordinate values of the nodes may be used to calculate the x coordinate value of the master server, and the y coordinate values of the nodes may be used to calculate the y coordinate value of the master server. Further, when the torus network is a 3D network, steps 1310, 1320, 1330, 1340, 1350, 1360 and 1370 may be separately performed for an x coordinate axis, a y coordinate axis, and a z coordinate axis.

The apparatus described herein may be implemented using hardware components, software components, or a combination thereof. For example, the apparatus and components described in the embodiments may be implemented using one or more general-purpose or special-purpose computers, for example, a processor, a controller, an arithmetic logic unit (ALU), a digital signal processor, a microcomputer, a field programmable array (FPA), a programmable logic unit (PLU), a microprocessor or any other apparatus (device) capable of responding to and executing instructions. A processing device may run an operating system (OS) and one or more software applications that run on the OS. The processing device may also access, store, manipulate, process, and create data in response to execution of the software. For convenience of understanding, the use of a single processing device is described, but those skilled in the art will understand that a processing device may comprise multiple processing elements and multiple types of processing elements. For example, a processing device may include multiple processors or a single processor and a single controller. Also, different processing configurations, such as parallel processors, are possible.

The software may include a computer program, code, instructions, or some combination thereof, and it is possible to configure processing devices or to independently or collectively instruct the processing devices to operate as desired. Software and data may be embodied permanently or temporarily in any type of machine, component, physical or virtual equipment, computer storage medium, or device, or in a propagated signal wave in order to provide instructions or data to the processing devices or to be interpreted by the processing devices. The software may also be distributed in computer systems over a network such that the software is stored and executed in a distributed manner. In particular, the software and data may be stored in one or more computer-readable recording media.

The above-described embodiments may be implemented as a program that can be executed by various computer means. In this case, the program may be recorded on a computer-readable storage medium. The computer-readable storage medium may include program instructions, data files, and data structures, either solely or in combination. Program instructions recorded on the storage medium may have been specially designed and configured for the present disclosure, or may be known to or available to those who have ordinary knowledge in the field of computer software. Examples of the computer-readable storage medium include all types of hardware devices specially configured to record and execute program instructions, such as magnetic media, such as a hard disk, a floppy disk, and magnetic tape, optical media, such as compact disk CD-ROM and a DVD, magneto-optical media, such as a floptical disk, ROM, RAM, and flash memory. Examples of the program instructions include machine code, such as code created by a compiler, and high-level language code executable by a computer using an interpreter. The hardware devices may be configured to operate as one or more software modules in order to perform the operation of the present disclosure, and vice versa.

Provided is a method that configures data servers on a torus network in consideration of the characteristics of a large-scale distributed file system.

Provided are an apparatus and method that store data of a client in multiple distributed file system nodes in a distributed file system based on a torus network.

Provided are an apparatus and method that are associated with a structure for improving the input/output performance of a distributed file system based on a torus network for constructing Exabyte-level cloud storage.

Provided are an apparatus and method that are associated with an input/output structure for minimizing the difference in latency between nodes and an increase in the latency, which are disadvantages of a torus network, when the torus network is used as an interconnection network for a distributed file system.

Provided are an apparatus and method that enable a distributed file system to be effectively constructed in a torus network by minimizing the difference in latency between nodes and an increase in the latency.

Provided are an apparatus and method that are associated with an input/output structure for decreasing input/output latency that occurs when data of a client is stored in multiple distributed file system nodes.

Provided are an apparatus and method that determine the location of a master server for receiving data of a client and processing the distribution and collection of data.

Provided are an apparatus and method that determine the location of a master server for receiving data of a client and processing the encoding and decoding of data.

Provided are an apparatus and method that determine the location of a master server depending on the status and arrangement of distributed file system nodes.

Although the embodiments of the present disclosure have been disclosed for illustrative purposes, those skilled in the art will appreciate that various modifications, additions and substitutions are possible, without departing from the scope and spirit of the invention. For example, if the described techniques are performed in a different order, if the described components, such as systems, architectures, devices, and circuits, are combined or coupled with other components by a method different from the described methods, or if the described components are replaced with other components or equivalents, the results are still to be understood as falling within the scope of the present disclosure.

What is claimed is:

1. A method for managing a distributed file system, comprising:
identifying a plurality of data-related nodes of a torus network, the plurality of data-related nodes being related to data;
determining a location of a node on the torus network based on respective locations of the plurality of data-related nodes on the torus network, wherein the location has a smallest maximum distance between the location and the plurality of data-related nodes; and
setting a node at the determined location on the torus network as the master server.

2. The method of claim 1, wherein the master server is a center node that takes charge of transmission of the data.

3. The method of claim 1, wherein the location is determined such that a latency of input or output of the data is minimized.

4. The method of claim 1, wherein the master server transmits the data using a propagation transmission scheme.

5. The method of claim 1, wherein the master server is one of a data server, a metadata server, and a client of the torus network.

6. The method of claim 1, wherein the distance is determined based on a number of additional nodes present in a path between the location and each of the plurality of data-related nodes.

7. The method of claim 1, wherein the location is a center of a distance between two nodes that are farthest away from each other, the two nodes being of the plurality of data-related nodes.

8. The method of claim 1, wherein:
the location is represented by coordinate values on multiple coordinate axes of the torus network, and
the coordinate values are calculated independently of each other.

9. The method of claim 1, wherein the location is determined in consideration of connection characteristics of the torus network.

10. The method of claim 1, wherein setting the node comprises notifying the node at the determined location that the node has been set as the master server.

11. The method of claim 1, wherein setting the node comprises moving data stored in a node falling outside of a series connection of the master server, among the nodes, to a node falling within the series connection.

12. The method of claim 1, wherein determining the location comprises:
generating a first group having multiple coordinate values of multiple nodes of the torus network, in which data is stored;
generating a second group of distances between two coordinate values based on the multiple coordinate values;
selecting a longest distance from among the distances;
generating a third group by shifting elements of the first group rightward such that, of coordinate values of the selected distance, a larger coordinate value is a first element and a smaller coordinate value is a last element;
generating a fourth group by changing coordinate values in the third group to values obtained by shifting the coordinate values in a positive direction of a coordinate axis such that the larger coordinate value is 0; and
determining a coordinate value of the master server based on the fourth group.

13. The method of claim 12, wherein:
the coordinate values include multiple coordinate values, and
determining the location is performed on each of the multiple coordinate values.

14. An apparatus for managing a distributed file system, comprising:
a processor for identifying a plurality of data-related nodes of a torus network, the plurality of data-related node being related to data, and determining a location of a master server on the torus network based on respective locations of the plurality of data-related nodes on the torus network, wherein the location has a smallest maximum distance between the location and the plurality of the data-related nodes; and a communication unit for notifying a node at the determined location that the node has been set as the master server.

15. A method for determining a location of a master server in a distributed file system, comprising:

generating a first group having multiple coordinate values of multiple nodes of a torus network, in which data is stored;

generating a second group of distances between two coordinate values based on the multiple coordinate values;

selecting a longest distance from among the distances;

generating a third group by shifting elements of the first group rightward such that, of coordinate values of the selected distance, a larger coordinate value is a first element and a smaller coordinate value is a last element;

generating a fourth group by changing coordinate values in the third group to values obtained by shifting the coordinate values in a positive direction of a coordinate axis such that the larger coordinate value is 0; and determining a coordinate value of the master server based on the fourth group.

16. The method of claim 15, wherein determining the coordinate value of the master server comprises:

determining a relative coordinate value of the master server based on the fourth group; and determining a reference coordinate value of the master server based on the relative coordinate value.

17. The method of claim 16, wherein the relative coordinate value is an average of a smallest coordinate value of the fourth group and a largest coordinate value of the fourth group.

18. The method of claim 17, wherein, when the average is not an integer, the relative coordinate value is a value obtained by rounding off the average.

19. The method of claim 17, wherein the reference coordinate value is generated by changing the relative coordinate value to a value obtained by shifting the relative coordinate value by the larger coordinate value of the coordinate values of the selected distance in the positive direction of the coordinate axis.

20. The method of claim 1, wherein the master server is not a node of the plurality of data-related nodes.

* * * * *